(12) United States Patent
Levin et al.

(10) Patent No.: US 11,899,797 B2
(45) Date of Patent: Feb. 13, 2024

(54) SYSTEM AND METHOD FOR DETECTING AND FOR ALERTING OF EXPLOITS IN COMPUTERIZED SYSTEMS

(71) Applicant: PERCEPTION POINT LTD., Tel-Aviv (IL)

(72) Inventors: Shlomi Levin, Ra'anana (IL); Michael Aminov, Tel-Aviv (IL)

(73) Assignee: PERCEPTION POINT LTD, Tel Aviv (IL)

( * ) Notice: Subject to any disclaimer, the term of this patent is extended or adjusted under 35 U.S.C. 154(b) by 355 days.

(21) Appl. No.: 16/347,596

(22) PCT Filed: Nov. 5, 2017

(86) PCT No.: PCT/IL2017/051206
§ 371 (c)(1),
(2) Date: May 6, 2019

(87) PCT Pub. No.: WO2018/083702
PCT Pub. Date: May 11, 2018

(65) Prior Publication Data
US 2019/0258806 A1    Aug. 22, 2019

Related U.S. Application Data

(60) Provisional application No. 62/516,126, filed on Jun. 7, 2017, provisional application No. 62/418,294, filed on Nov. 7, 2016.

(51) Int. Cl.
*G06F 21/57* (2013.01)
*G06F 21/52* (2013.01)
(Continued)

(52) U.S. Cl.
CPC ............ *G06F 21/577* (2013.01); *G06F 21/44* (2013.01); *G06F 21/52* (2013.01); *G06F 21/552* (2013.01);
(Continued)

(58) Field of Classification Search
CPC ........ G06F 21/577; G06F 21/44; G06F 21/52; G06F 21/552; G06F 21/56; G06F 2221/033; G06F 21/50
See application file for complete search history.

(56) References Cited

U.S. PATENT DOCUMENTS 8,707,433 B1 *  4/2014  Mann .................. G06F 11/3003
                                                  726/22
9,438,623 B1     9/2016  Thioux et al.
(Continued)

OTHER PUBLICATIONS

Goel et al., "Reconstructing Systems State for Intrusion Analysis", Apr. 1, 2008, SIGOPS Operating Systems Review, vol. 42, Issue 3, pp. 21-28.
(Continued)

*Primary Examiner* — Daniel B Potratz
(74) *Attorney, Agent, or Firm* — PEARL COHEN ZEDEK LATZER BARATZ LLP

(57) ABSTRACT

Systems and methods of detecting an exploit of a vulnerability of a computing device, including receiving an execution flow of at least one process running in a processor of the computing device, wherein the execution flow is received from a performance monitoring unit (PMU) of the processor, receiving memory pages from a memory of the computing device, reconstructing the execution flow of the process on another processor based on PMU data and the memory pages, running at least one exploit detection algorithm on the reconstructed process in order to identify an exploit attempt and issuing an alert.

19 Claims, 15 Drawing Sheets

(51) Int. Cl.
*G06F 21/55* (2013.01)
*G06F 21/56* (2013.01)
*G06F 21/44* (2013.01)

(52) U.S. Cl.
CPC ........ *G06F 21/56* (2013.01); *G06F 2221/033* (2013.01)

(56) References Cited

U.S. PATENT DOCUMENTS

| | | | |
|---|---|---|---|
| 2005/0010804 | A1 | 1/2005 | Bruening et al. |
| 2009/0328185 | A1 | 12/2009 | Berg et al. |
| 2014/0075556 | A1* | 3/2014 | Wicherski ............... G06F 21/52 726/23 |
| 2015/0199513 | A1 | 7/2015 | Ismael et al. |
| 2015/0215335 | A1* | 7/2015 | Giuliani ................ G06F 21/554 726/23 |
| 2016/0021134 | A1* | 1/2016 | Li ........................ G06F 21/567 726/23 |
| 2016/0180079 | A1* | 6/2016 | Sahita ................... G06F 21/554 726/22 |
| 2016/0283714 | A1* | 9/2016 | LeMay .................. G06F 21/44 |
| 2016/0381043 | A1* | 12/2016 | Yamada ................ G06F 21/554 726/23 |
| 2017/0091454 | A1* | 3/2017 | Sukhomlinov ....... G06F 21/566 |
| 2017/0185791 | A1* | 6/2017 | Yamada .................. G06F 21/52 |

OTHER PUBLICATIONS

International Search Report of Application No. PCT/IL2017/051206 dated Feb. 8, 2018.

Yubin Xia et al., "CFImon: Detecting violation of control flow integrity using performance counters", Jun. 25, 2012, Dependable Systems and Networks (DSN), 2012 $42^{nd}$ Annual IEEE/IFIP International Conference On, IEEE, pp. 1-12.

Supplementary European Search Report for Application No. EP 17867010 dated Apr. 23, 2020.

* cited by examiner

```
┌─────────────────────────────────────────────────┐
│ Receiving an execution flow of at least one process │
│ running in a processor of the computing device,     │
│ wherein the execution flow is received from a       │
│ performance monitoring unit (PMU) of the            │
│ processor                                           │
└─────────────────────────────────────────────────┘
 801 ↓

┌─────────────────────────────────────────────────┐
│ Receiving memory pages from a memory of the     │
│ computing device                                │
└─────────────────────────────────────────────────┘
 802 ↓

┌─────────────────────────────────────────────────┐
│ Reconstructing the execution flow of the process on │
│ another processor based on PMU data and the         │
│ memory pages                                        │
└─────────────────────────────────────────────────┘
 803 ↓

┌─────────────────────────────────────────────────┐
│ Running at least one exploit detection algorithm on │
│ the reconstructed process in order to identify an   │
│ exploit attempt                                     │
└─────────────────────────────────────────────────┘
 804 ↓

┌─────────────────────────────────────────────────┐
│ Issuing and alert                               │
└─────────────────────────────────────────────────┘
 805
```

Fig. 8

SYSTEM AND METHOD FOR DETECTING AND FOR ALERTING OF EXPLOITS IN COMPUTERIZED SYSTEMS

CROSS-REFERENCE TO RELATED APPLICATIONS

This application is a National Phase Application of PCT International Application No. PCT/IL2017/051206, International Filing Date: Nov. 5, 2017, claiming the benefit of U.S. Patent Applications Nos. 62/418,294, filed Nov. 7, 2016, and 62/516,126, filed Jun. 7, 2017, which are hereby incorporated by reference.

FIELD OF THE INVENTION

The present invention generally relates to detection of exploits in computerized systems. More particularly, the present invention relates to issuing alerts upon detection of attacks that exploit vulnerabilities to take control of the central processing unit (CPU).

BACKGROUND OF THE INVENTION

In recent years, various managed computer services have become the standard when it comes to organizations choosing where to build their IT infrastructure. Some enterprises may choose to use an email service in the cloud rather than manage their own email servers and software. The main reason for this is that it's cheaper and more secure to let someone else deal with matters of infrastructure and maintenance. Therefore managed services such as IaaS, PaaS and SaaS are consumed by enterprises worldwide. Consequently, the security of these managed services becomes a real issue once a lot of organizations' IP reside upon these services.

Zero-day vulnerability, e.g. time of identifying bugs in the system, is defined as an undisclosed computer-software vulnerability that malicious parties (or hackers) can exploit to adversely affect computer programs, data, additional computers or a network. Such vulnerabilities have become common in targeted attacks against organizations, for instance for corporate espionage and/or economical motives. Cloud providers run hundreds of different services and programs to serve their clients, situating them as the main target for such targeted attacks. There are many different possible attack vectors that can affect the data center. For instance, an attacker can lease part of the infrastructure like any other organization and perform an attack called Virtual Machine Escape which exploits vulnerabilities in the underlying infrastructure code giving the attacker control over the infrastructure and enabling the attacker access to all the data that is present in the system. In a different scenario, an attacker can attack a single client by breaching the services running within that specific client's virtual machines, for example a Secure-Shell (SSH) service that contains vulnerability that only the attacker knows about.

Data centers (e.g., servers of FACEBOOK®) run hundreds of software services and therefore are at risk of being breached by a vulnerability that may exist in at least one such service. This is when the first stage of the attack takes place by exploiting vulnerabilities in a software service or inside a virtual machine. The exploit manages to gain control of the CPU and execute a low level code called 'shellcode', which bases itself on the underlying infrastructure and starts the second stage of the attack. The second stage usually includes more advanced malicious logic such as installing a backdoor program which gives the attacker persistent access to the system, thereby giving attackers the power to operate independently and gain control of the system. In addition to data centers, various monitoring units can also be targeted and attacked in a similar way.

Security solutions can be implemented either at the hardware level or the software level. Hardware level implementations (such as NX-bit, TPM and SGX) have the advantage of full system visibility and don't affect the performance of the system. However, their long integration cycles mean that attackers have enough time to create new exploitation techniques keeping them at an advantage point. Software level security solutions have short integration cycles and update frequently but have limited visibility of the system. Moreover, all security software is essentially based on "hooking" into applications to gain visibility which greatly affects the performance, stability and integrity of the application, for instance running in the data center.

There are two possible deployment methods of security products, network based and host (i.e. endpoint/server) based deployments. The host based deployment uses a variety of techniques to detect malware. The most common being static signatures that are continuously compared against the file system, however the continuous scanning causes performance reduction and can easily be bypassed by simply performing small changes in the malware. Dynamic behavior based signatures were developed but due to the nature of implementation (i.e. memory hooks etc.), the stability of the system is compromised as well as resulting in high false positive rates. Consequently, data center operators prefer to deploy network based security solutions.

Similarly to host based deployments, network security solutions scan network streams for known malware signatures which eliminate the high performance penalty of host based scanning, however still easily bypassable for the same reasons. Dynamic behavior based signatures are also not applicable to networks as they require executing binary code which does not comply with the performance requirements of a data center network.

Regardless of the attack vector and exploitation method employed, the ultimate goal of an attacker is to perform malicious computations on the target system by executing machine instructions that are under control of the attacker. Usually, malicious computations are caused by illegitimate code that was not provided or intended to be executed by the developer of the exploited service (e.g. SSH). The malicious code is usually introduced into the target system using external network data or application files.

To counter code injection attacks, hardware vendors introduced a feature that prevents designated memory regions from being executed by the processor. In this way, code that it introduced (or injected) into memory regions that serve as anything but code regions, will fail to execute when the attacker triggers a vulnerability that diverts the execution flow to his injected code. To bypass this hardware enforced mitigation, attackers leverage code reuse attacks where instead of injecting code, they simply piece together existing snippets of code of the attacked application to perform the same logic that their injected code would have done. An attack of code reuse abuses control flow related machine opcodes to piece together the logic, for instance a method that abuses the return opcode (e.g., return oriented programming) In order to stop these types of attacks that exploit the computer architecture, a security solution has to have access to what is actually happening at that level. Most of the technologies today search for malware with signatures of previously discovered samples of that same malware, however thousands of new variants are introduced daily by simply permuting the original ancestor. Therefore security vendors can't keep up in a timely manner to provide proper security.

Hardware level security solutions possess the visibility to thwart such attacks, however attackers remain ahead of the game due to long integration cycles and the requirement to recompile software source code to support new hardware based features. Every time a new hardware level security component is developed, the attackers manage to develop a bypass so by the time the hardware is implemented worldwide it is actually ineffective. There is therefore a need for a security solution having the update cycles of software with the visibility of hardware solutions.

SUMMARY OF THE INVENTION

There is thus provided, in accordance with some embodiments of the invention, a method of detecting an exploit of a vulnerability of a computing device, the method including receiving an execution flow of at least one process running in a processor of the computing device, wherein the execution flow is received from a performance monitoring unit (PMU) of the processor, receiving memory pages from a memory of the computing device, reconstructing the execution flow of the process on another processor based on PMU data and the memory pages, running at least one exploit detection algorithm on the reconstructed process in order to identify an exploit attempt, and issuing an alert.

In some embodiments, the process running on the processor of the computing device may be interrupted when an exploit is detected. In some embodiments, a map of addresses may be maintained in memory of the processor. In some embodiments, the structured exception handler (SEH) of the operating system of the processor may be mapped. In some embodiments, memory address of SEH may be added.

In some embodiments, structured exception handler (SEH) may be checked if registered. In some embodiments, at least one of memory allocation addresses and memory deallocation addresses may be mapped. In some embodiments, at least one of memory allocation function and memory deallocation function may be checked is called.

In some embodiments, at least one of allocation counter and deallocation counter may be increased. In some embodiments, difference of allocation counter and deallocation counter may be checked if greater than a predefined value. In some embodiments, at least one instruction may be received. In some embodiments, a shadow stack may be maintained In some embodiments, a call instruction in the execution flow may be checked if it has been executed.

In some embodiments, expected return address may be pushed to the shadow stack. In some embodiments, a return instruction may be checked if it has been executed. In some embodiments, target address may be checked if it is different from top address on shadow stack. In some embodiments, an address may be popped from the stack. In some embodiments, a database of legal addresses may be maintained to transfer control indirectly to, and instructions may be received for indirect branch from the reconstructed execution flow. In some embodiments, the received instruction may be checked if it corresponds to the database of legal addresses to transfer control indirectly to.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 shows a flowchart for a method of detecting an exploit of a vulnerability of a computing device, according to some embodiments of the invention;

Figure 1:
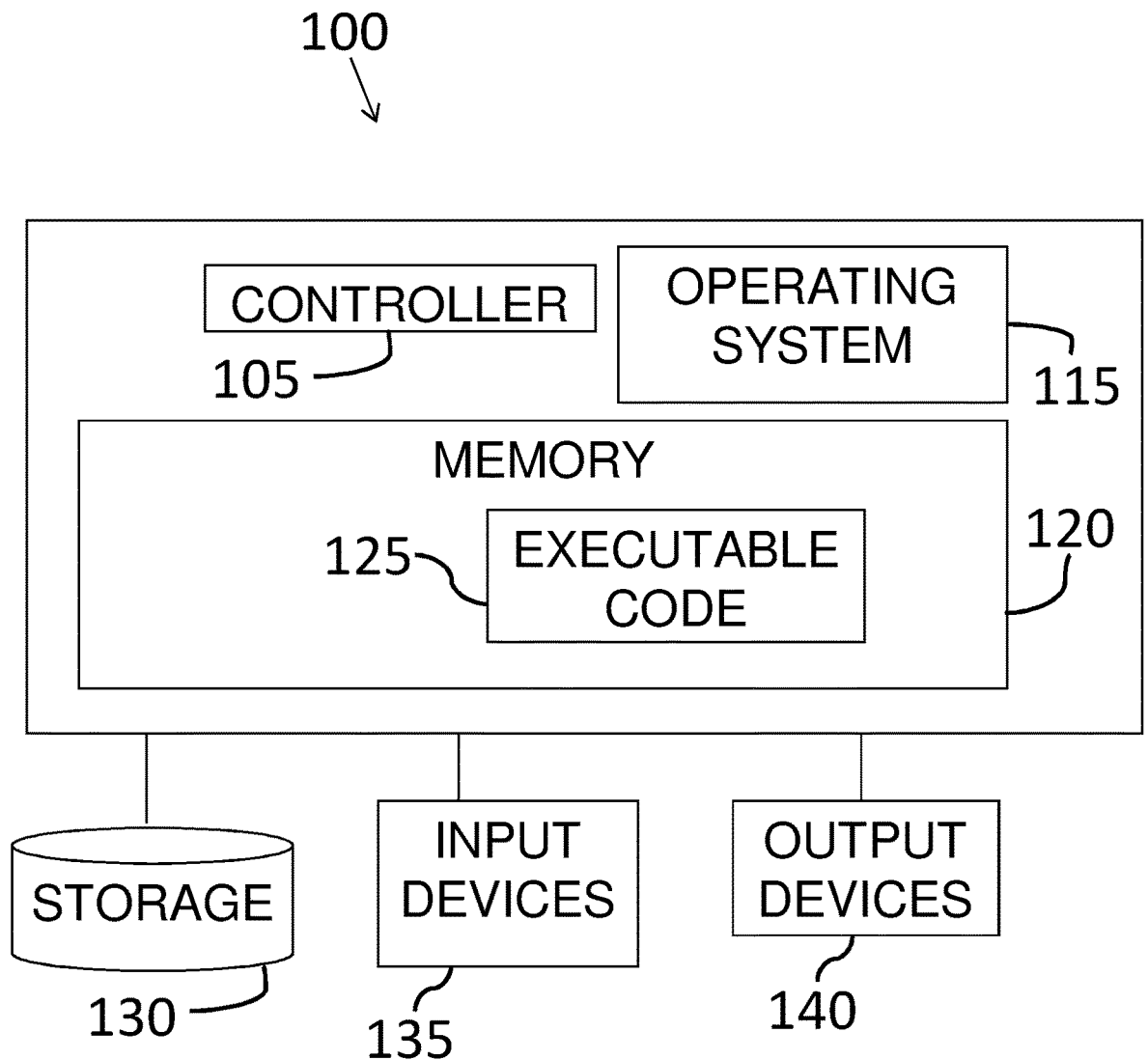
FIG. 1 shows a block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a block diagram of an exemplary computing device according to embodiments of the present invention. Computing device 100 may include a controller 105 that may be, for example, a central processing unit processor (CPU), a chip or any suitable computing or computational device, an operating system 115, a memory 120, a storage 130, an input devices 135 and an output devices 140.

Operating system 115 may be or may include any code segment designed and/or configured to perform tasks involving coordination, scheduling, arbitration, supervising, controlling or otherwise managing operation of computing device 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application for managing power consumption data. Where applicable, executable code 125 may carry out operations described herein in real-time. Computing device 100 and executable code 125 may be configured to update, process and/or act upon information at the same rate the information, or a relevant event, are received. In some embodiments, more than one computing device 100 may be used. For example, a plurality of computing devices that include components similar to those included in computing device 100 may be connected to a network and used as a system. For example, managing power consumption data may be performed in realtime by executable code 125 when executed on one or more computing devices such computing device 100.

Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a modem, printer or facsimile machine, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

Some embodiments may be provided in a computer program product that may include a non-transitory machine-readable medium, with instructions stored thereon, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPUs) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 2:
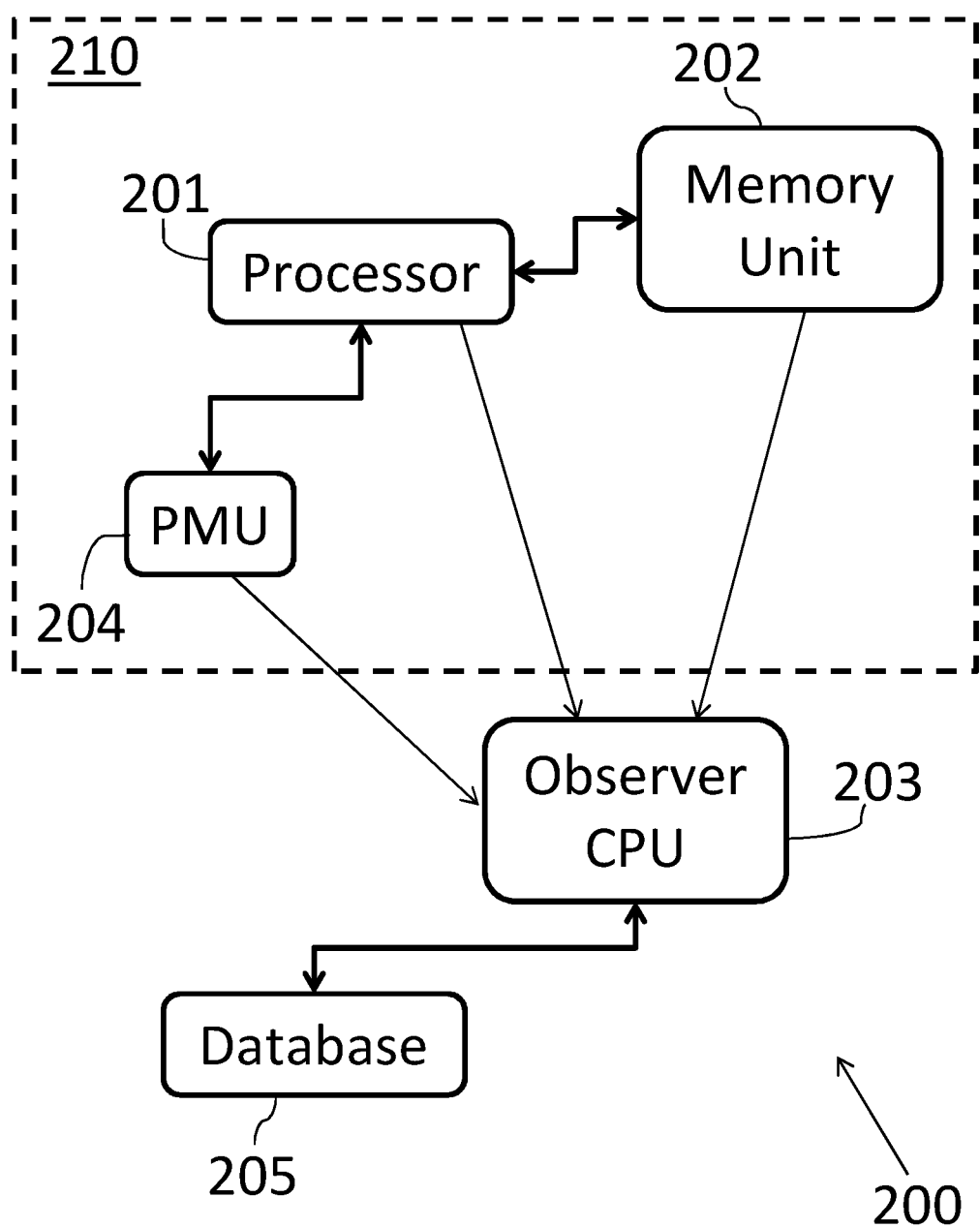
FIG. 2 schematically illustrates a block diagram of an exploit detection system, according to some embodiments of the invention.

Reference is now made to FIG. 2, which schematically illustrates a block diagram of an exploit detection system 200, according to some embodiments of the invention. It should be noted that the direction of arrows in FIG. 2 may indicate the direction of information flow. Exploit detection system 200 may be utilized to issue an alert upon detection of exploits in a computerized device 210 such as computing device 100 (e.g., as shown in FIG. 1), having a processor 201 operably coupled to a memory unit 202.

It should be appreciated that computerized device 210 as used hereinafter may also refer to an endpoint of a data center of a computerized system. In some embodiments, computerized device 210, for example a personal computer (PC) or a smartphone, may further include a performance monitoring unit (PMU) 204 that may be configured to monitor the operation of processor 201.

It should be appreciated that in order to prevent attacks that exploit the computer architecture, it may be required to have access to actual processes at the hardware and/or software computing level (for example detecting exploit below the layer of the operating system). In some embodiments, gathering data of actual computer processes (e.g., from the PMU) may allow access to logs of code execution such that exploit or breach detection may be allowed, as further described hereinafter.

According to some embodiments, exploit detection system 200 may include an observer CPU 203 configured to receive data corresponding to the processing execution flow from computerized device 210. Observer CPU 203 may receive execution flow data from PMU 204 and/or processor 201. In some embodiments, observer CPU 203 may further receive memory logs (e.g. RAM) from processor 201 and/or memory unit 202. It should be noted that while processor 201 executes code and/or specific programs the observer CPU 203 may be configured to reconstruct the execution and constantly check the instructions being executed. It may then be possible to act upon these instructions and detect violations.

According to some embodiments, observer CPU 203 may be implemented in a dedicated hardware component (e.g., on a separate computer chip) and/or as software algorithm. In some embodiments, observer CPU 203 may receive trace data (with information regarding executed instructions) from the processor 201, for instance using branch tracing and/or processor tracing techniques.

It should be appreciated that memory logs as used hereinafter may refer to memory pages and/or memory images. In some embodiments, data received by observer CPU 203 may be at least temporarily stored at a database 205.

In some embodiments, observer CPU 203 may reconstruct the execution flow from the received data and memory pages so as to allow comparison (e.g., with data stored at database 205) to expected behavior and thereby detect exploits therein. In some embodiments, observer CPU 203 may further be configured to verify that the sequence of opcodes does not include malicious content attempting to exploit vulnerabilities of the process. In some embodiments, observer CPU 203 may monitor execution of code from the stack indicating a possible attack.

According to some embodiments, in case that observer CPU 203 is an endpoint of data center and an attack is detected, exploit detection system 200 may automatically issue an alert and/or disable that endpoint (or node) so as to maintain normal operation of the remaining system, and/or prevent spreading of the attack to other endpoints. In some embodiments, a crash in the system may indicate that the detected exploit is not an attack since attackers desire to prevent crashes.

In some embodiments, at least two different exploit detection algorithms (e.g., fifteen algorithms) may be implemented on observer CPU 203 (and stored at database 205), where each exploit detection algorithm may be dedicated to detect a different exploit. The at least two exploit detection algorithms may run simultaneously until at least one exploit detection algorithm detects an exploit, and for instance issues an alert.

Reference is now made to FIGS. 3, 4A-4B, 5A-5B and 6A-6B which show flowcharts with various examples of exploit detection algorithms. It should be appreciated that upon detection of an exploit by at least one such algorithm an alert may be issued by the processor 201 and/or by observer CPU 203, e.g. to the user, so as to prevent harm to the system.

Figure 3:
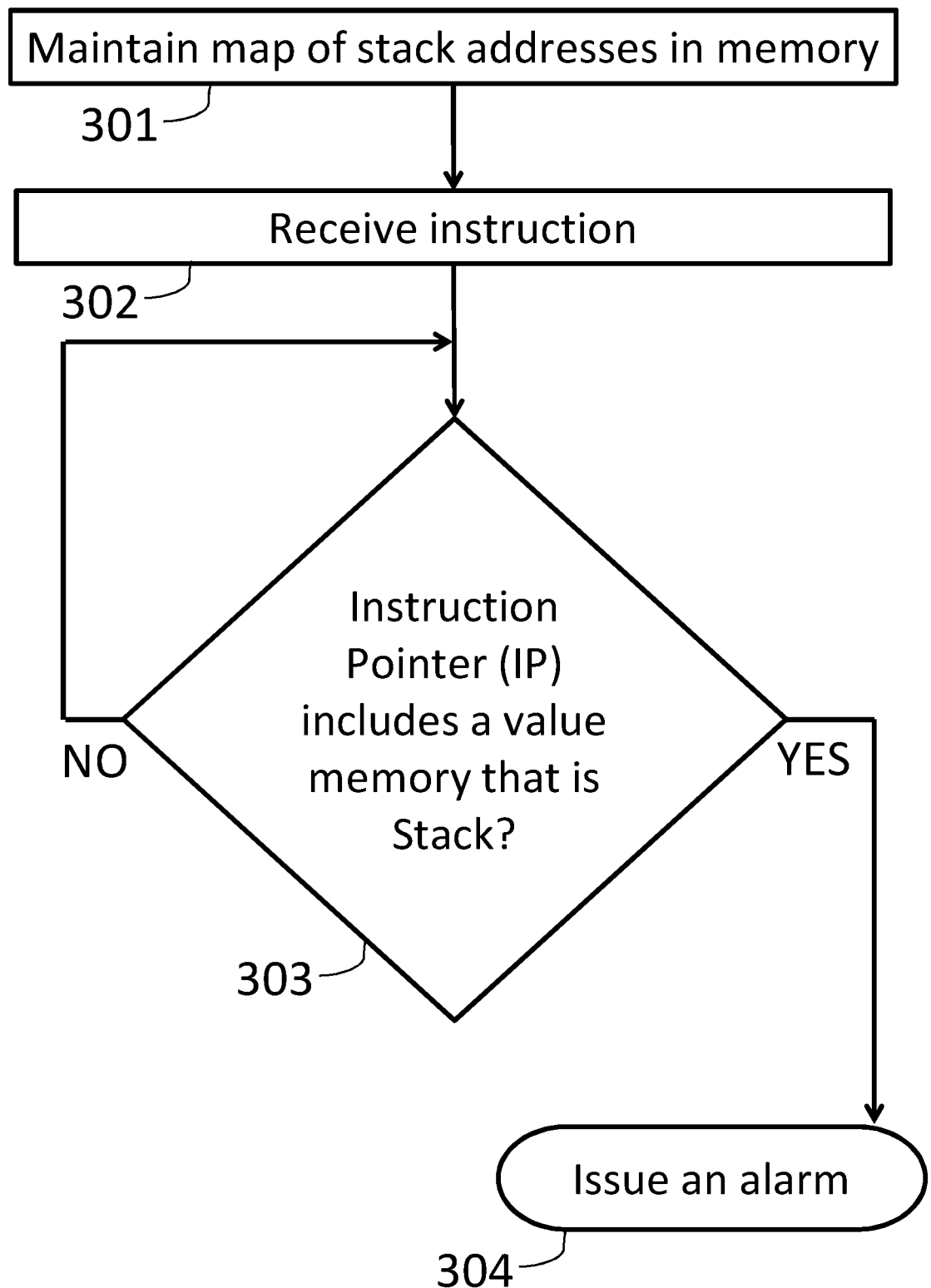
FIG. 3 shows a flowchart for a stack injection exploit detection algorithm, according to some embodiments of the invention.

FIG. 3 shows a flowchart for a stack injection exploit detection algorithm, according to some embodiments of the invention. Stack injection exploit detection algorithm may include observer CPU 203 to maintain 301 stack addresses in memory (e.g., in database 205), and receive instructions 302. It should be appreciated that as used herein stack memory may also refer to dynamic (or heap) memory.

Observer CPU 203 may receive an instruction pointer (IP) from PMU 204, check 303 that the IP includes a value memory that is a stack, such that observer CPU 203 may issue 304 an alert. In case that value memory is not a stack 303, observer CPU 203 may continue iteration until a stack is detected.

Figure 4A:
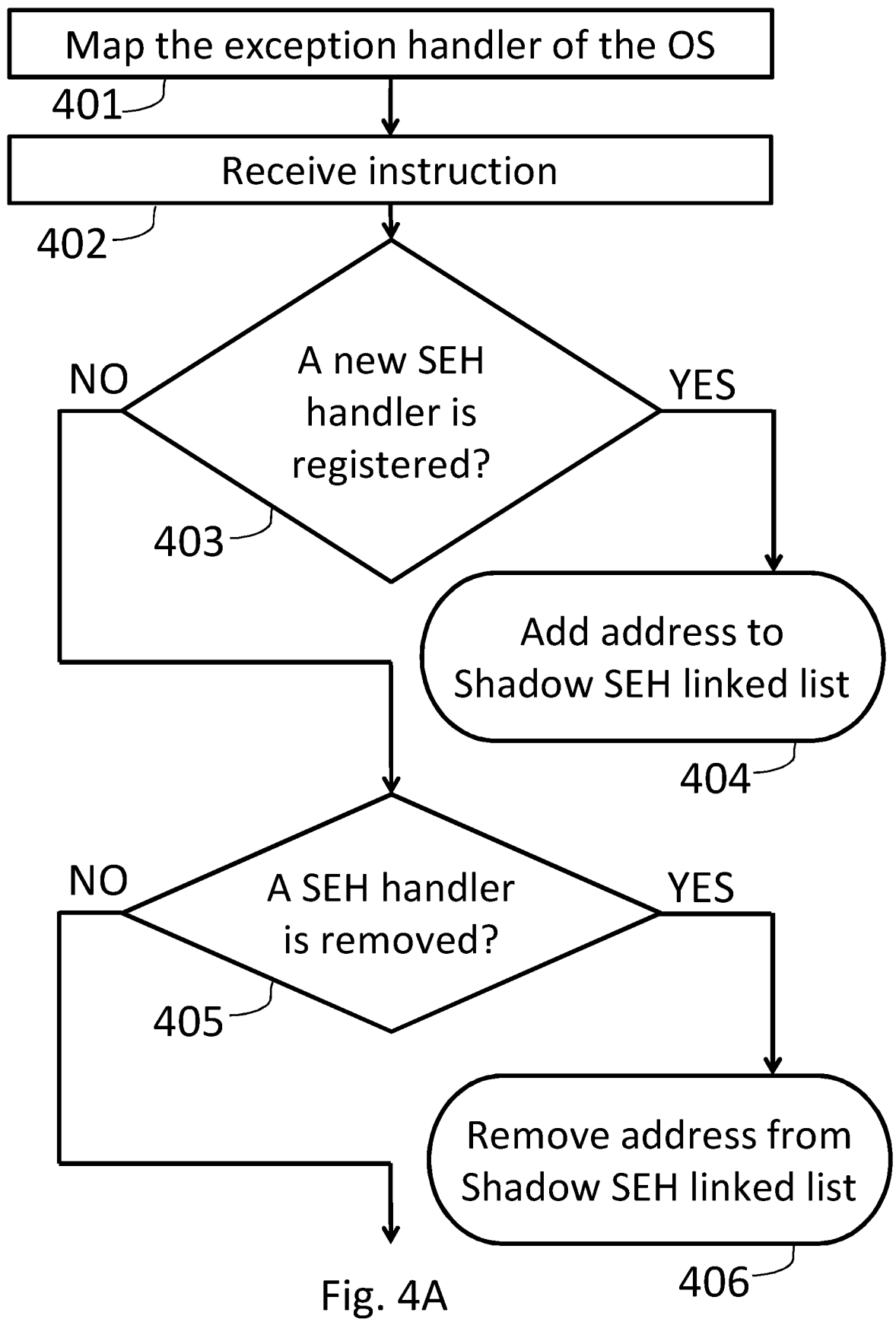
FIG. 4A shows a flowchart for a structured exception handling (SEH) exploit detection algorithm, according to some embodiments of the invention.
Figure 4B:
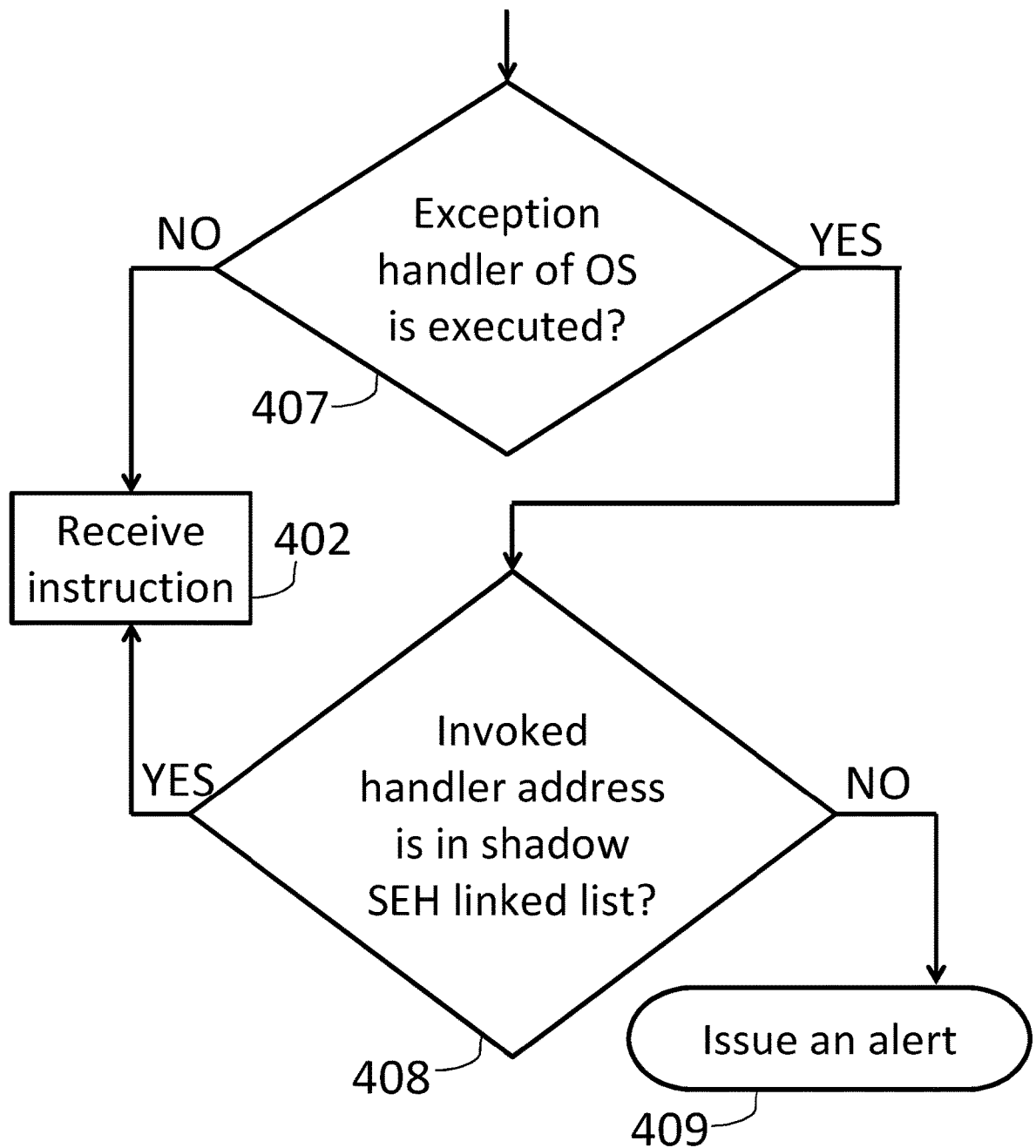
FIG. 4B shows a continuation of the flowchart from FIG. 4A, according to some embodiments of the invention.

FIGS. 4A-4B show a flowchart for a structured exception handling (SEH) exploit detection algorithm, according to some embodiments of the invention. SEH exploit detection algorithm may include observer CPU 203 to map 401 the SEH handler of the operating system, e.g. of computerized device 210, and receive instructions 402. Observer CPU 203 may check 403 that if a new SEH handler is registered, the corresponding handler address may be added to a shadow SEH linked list 404. It should be noted that the shadow SEH keeps track of the SEH handler registration and removal in order to detect an exploitation attempt.

In case that no SEH is registered 403, observer CPU 203 may continue to check 405 if SEH handler has been removed. In case that SEH handler has been removed 405, observer CPU 203 may remove 406 the address from the shadow SEH linked list. It should be noted that while SEH handlers are discussed herein, other tracking systems may also be applicable, and a different example is illustrated in FIGS. 5A-5B.

In case that SEH handler has not been removed 405, observer CPU 203 may check 407 if exception handler of the operating system has been invoked. In case that exception handler of the operating system has not been executed 407, observer CPU 203 may return to check 402 the next instruction to be processed. It should be noted that due to the (circular) flow structure of the algorithm, for each executed instruction the algorithm may perform checks 403 and/or 405 and/or 407 repeatedly. In some embodiments, only when check 407 is negative then the next instruction may be processed.

In case that exception handler of the operating system has been executed 407, observer CPU 203 may continue to check 408 if invoked handler address is in the shadow SEH linked list. In case that invoked handler address is in the shadow SEH linked list 408, observer CPU 203 may return to check 402 the next instruction to be processed. In case that invoked handler address is not in the shadow SEH linked list 408, observer CPU 203 may issue 409 an alert.

Figure 5A:
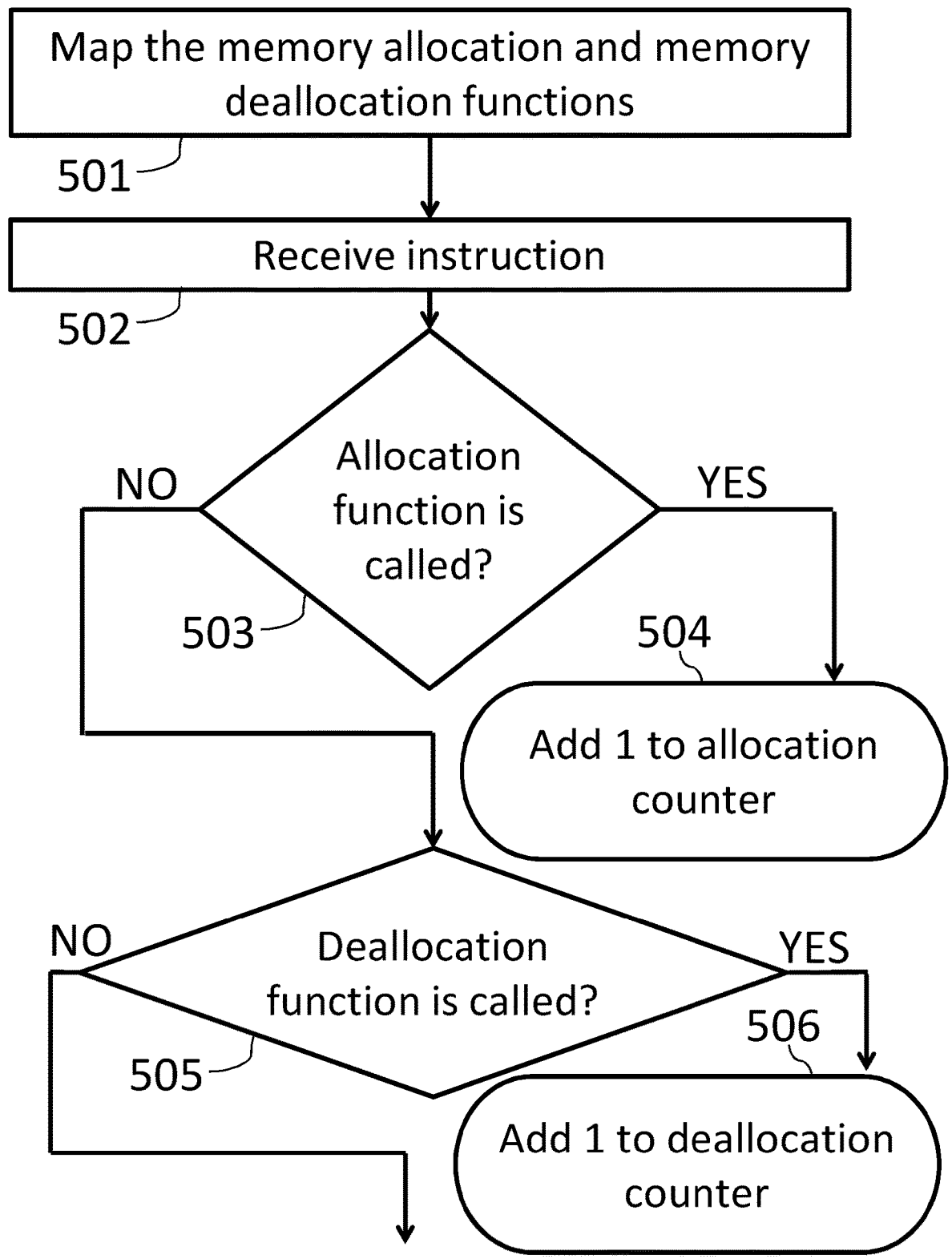
FIG. 5A shows a flowchart for a use of memory allocation tracking exploit detection algorithm, according to some embodiments of the invention.
Figure 5B:
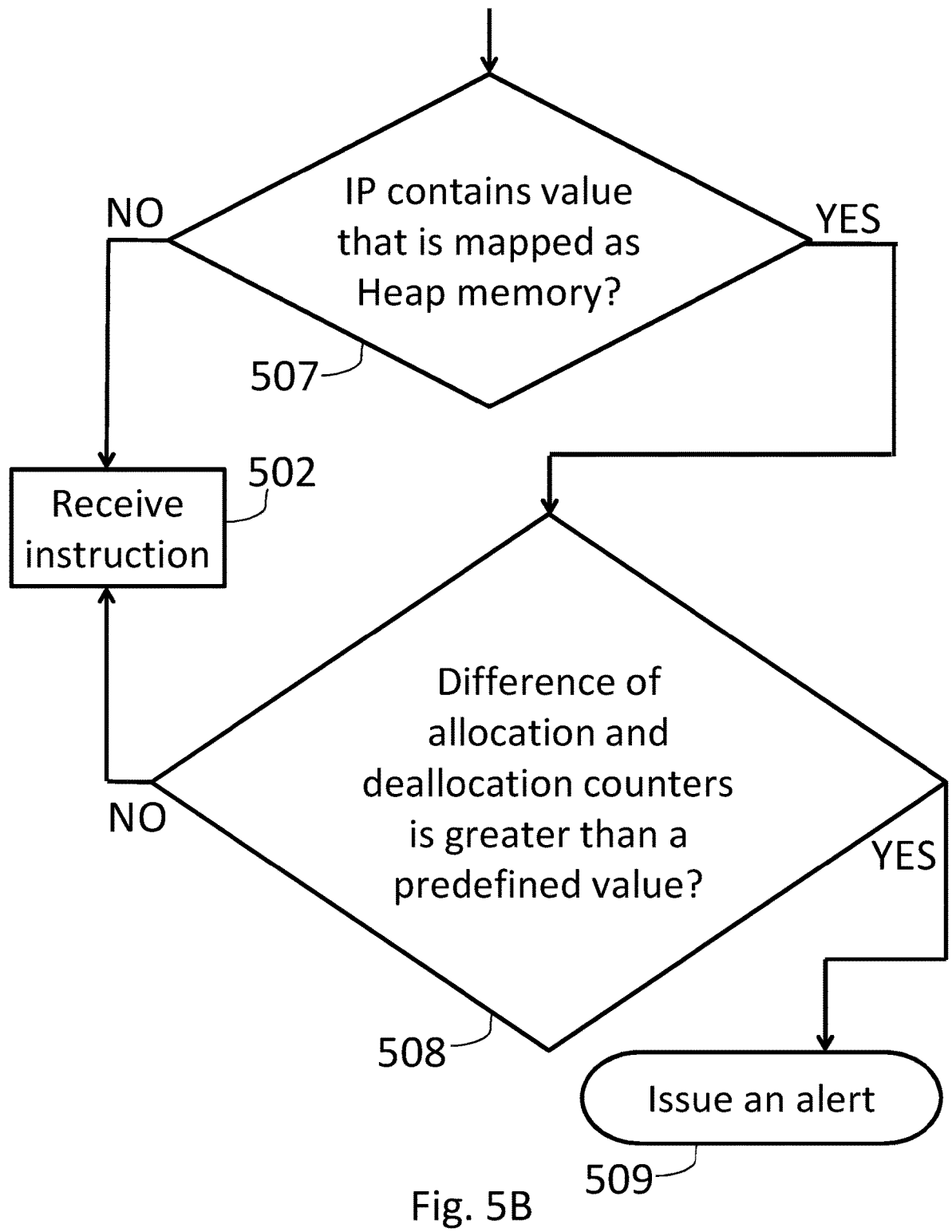
FIG. 5B shows a continuation of the flowchart from FIG. 5A, according to some embodiments of the invention.

FIGS. 5A-5B show a flowchart for a use of memory allocation tracking exploit detection algorithm, according to some embodiments of the invention. Memory allocation tracking exploit detection algorithm may include observer CPU 203 to 501 the memory allocation and memory deallocation functions, receive instructions 502, and may also check 503 that an allocation function is called.

In case that an allocation function has been called 503, observer CPU 203 may add 1 to the allocation counter 504. In case that an allocation function has not been called 503, observer CPU 203 may check 505 if a deallocation has been called. In case that a deallocation function has been called 505, observer CPU 203 may add 1 to the deallocation counter 506.

In case that a deallocation function has not been called 505, observer CPU 203 may check 507 if the IP contains a value that is mapped as heap memory. In case that IP does not contain a value that is mapped as heap memory 507, observer CPU 203 may return to also check 502 the next instruction to be processed. It should be noted that due to the (circular) flow structure of the algorithm, for each executed instruction the algorithm may perform checks 503 and/or 505 and/or 507 repeatedly. In some embodiments, only when check 507 is negative then the next instruction may be processed.

In case that the IP contains a value that is mapped as heap memory 507, observer CPU 203 may check 508 if difference between allocation and deallocation counters is greater than a predefined value (e.g., greater than ten). In case that the difference is not greater than the predefined value 508, observer CPU 203 may return to also check 502 the next instruction to be processed. In case that the difference is greater than the predefined value 508, observer CPU 203 may issue 509 an alert.

Figure 6A:
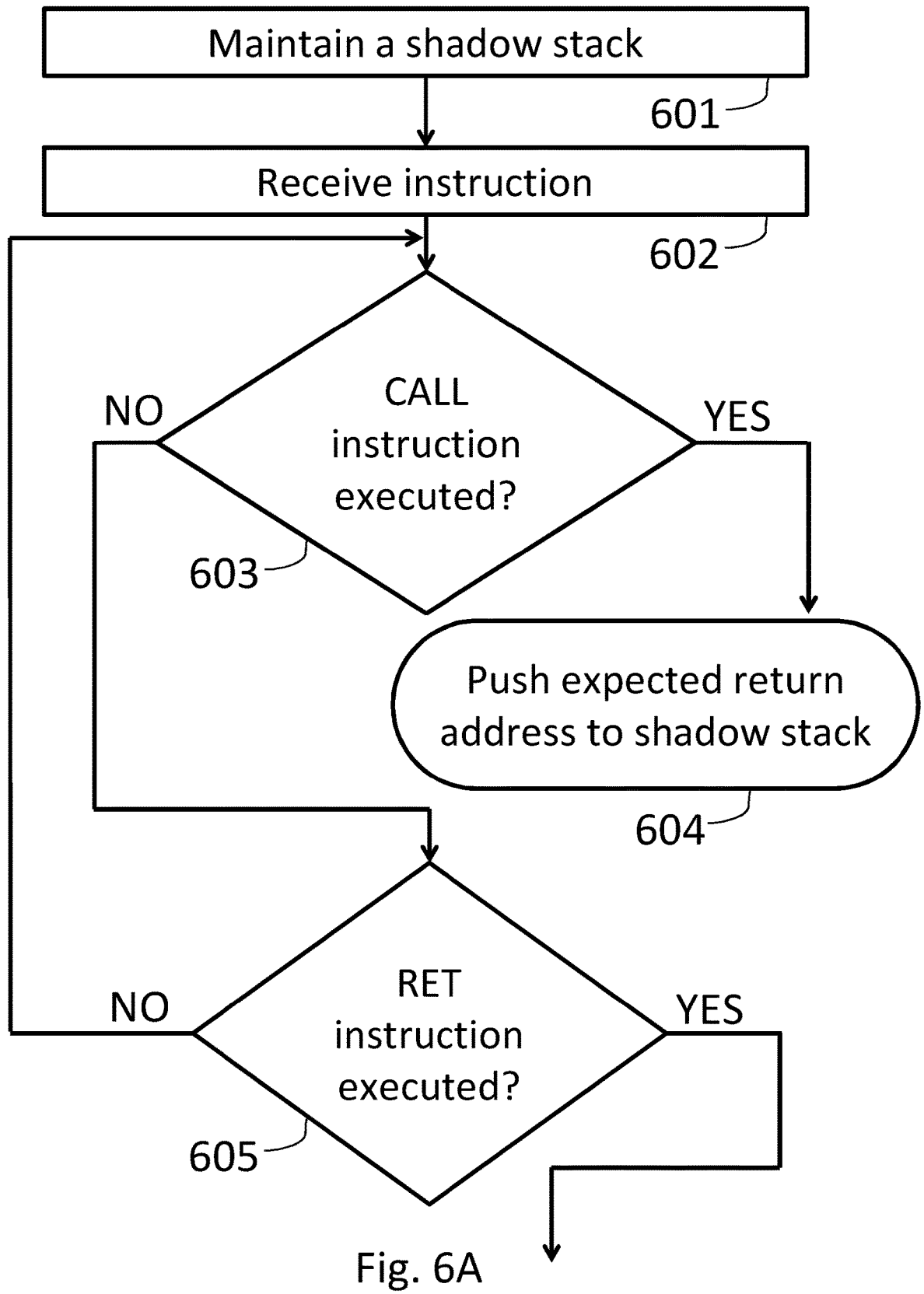
FIG. 6A shows a flowchart for a first return oriented programming exploit detection algorithm, according to some embodiments of the invention.
Figure 6B:
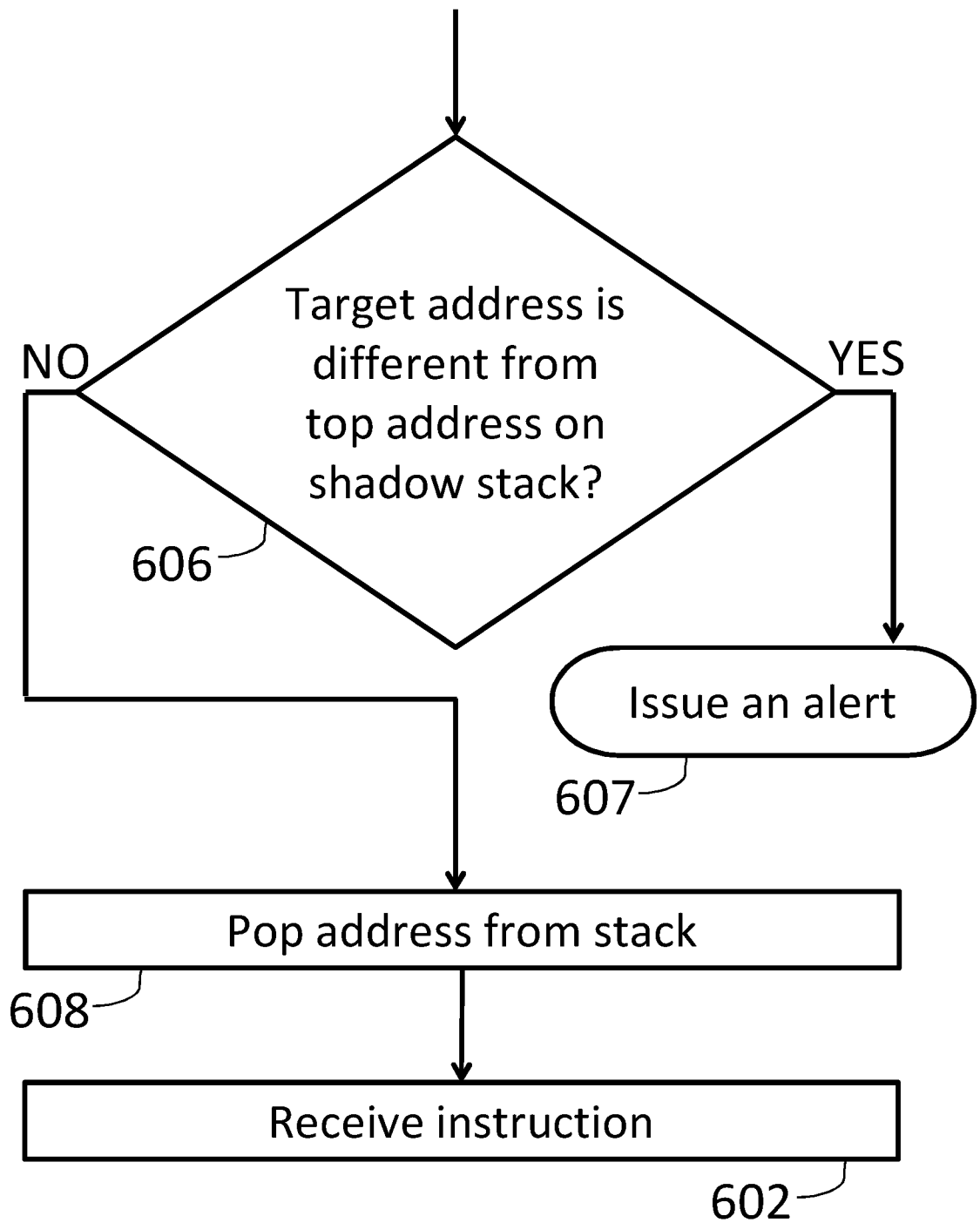
FIG. 6B shows a continuation of the flowchart from FIG. 6A, according to some embodiments of the invention.

FIGS. 6A-6B show a flowchart for a first return oriented programming (ROP) exploit detection algorithm, according to some embodiments of the invention. The first return oriented exploit detection algorithm may include observer CPU 203 to maintain a shadow stack 601, and receive instructions 602. Observer CPU 203 may then check 603 if a 'call' (or return) instruction in the execution flow has been executed for verification.

In case that a call instruction has been executed 603, observer CPU 203 may push 604 expected return address to the shadow stack. In case that a call instruction has not been executed 603, observer CPU 203 may check 605 if a return (RET) instruction has been executed. In case that a return instruction has not been executed 605, observer CPU 203 may return to check 602 the next instruction to be processed.

In case that a return instruction has been executed 605, observer CPU 203 may check 606 if target address is different from top address on shadow stack. In case that target address is different from top address on shadow stack 606, observer CPU 203 may issue 607 an alert. It should be noted that due to the (circular) flow structure of the algorithm, for each executed instruction the algorithm may perform checks 603 and/or 605 and/or 606 repeatedly. In some embodiments, only when check 606 is negative then the next instruction may be processed.

In case that target address is not different from top address on shadow stack 606, observer CPU 203 may pop 608 an address (e.g., most recent address which correctly matched the anticipated address) from the stack, and then return to check 602 the next instruction to be processed.

Figure 6C:
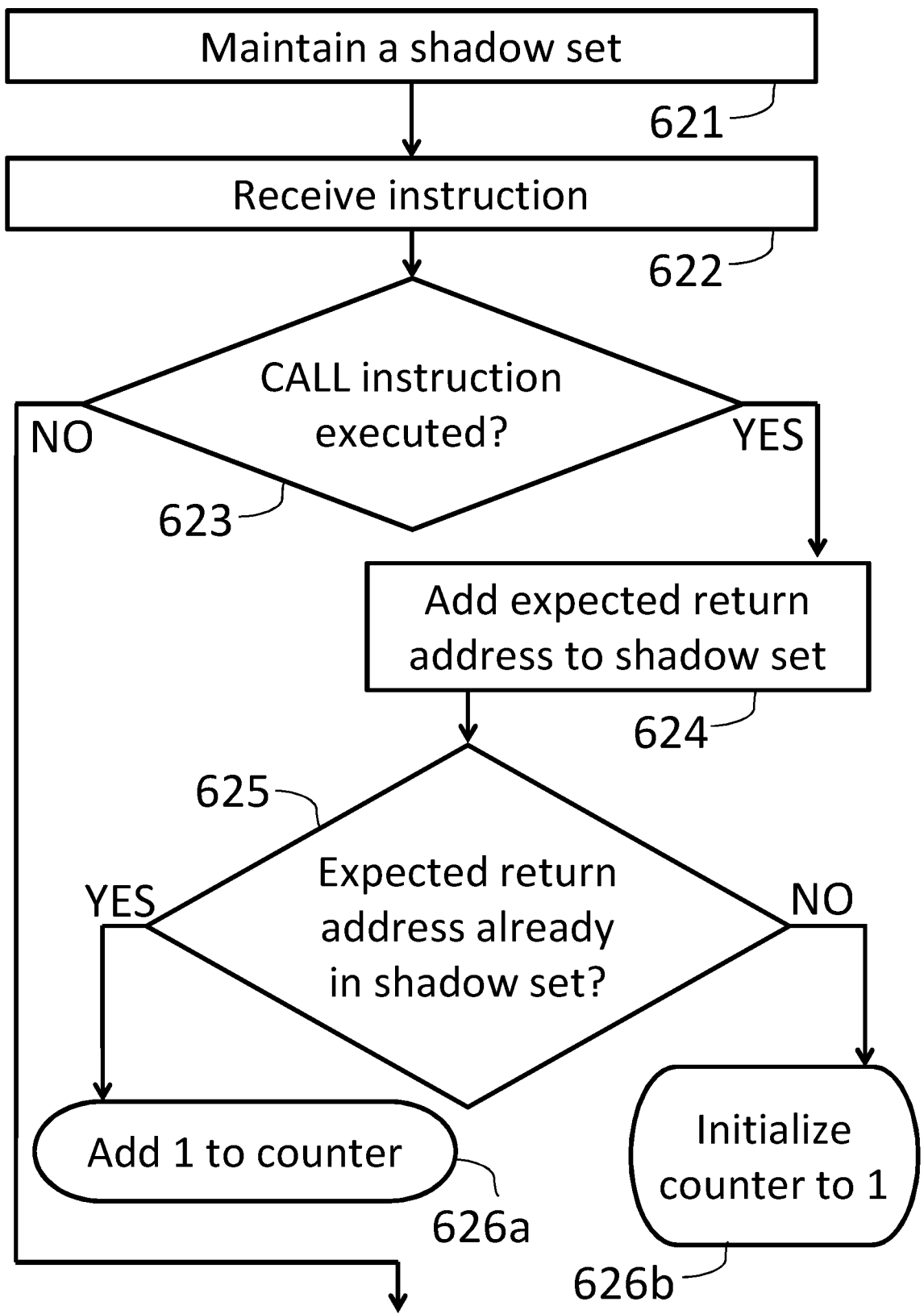
FIG. 6C shows a flowchart for a second return oriented programming exploit detection algorithm, according to some embodiments of the invention.
Figure 6D:
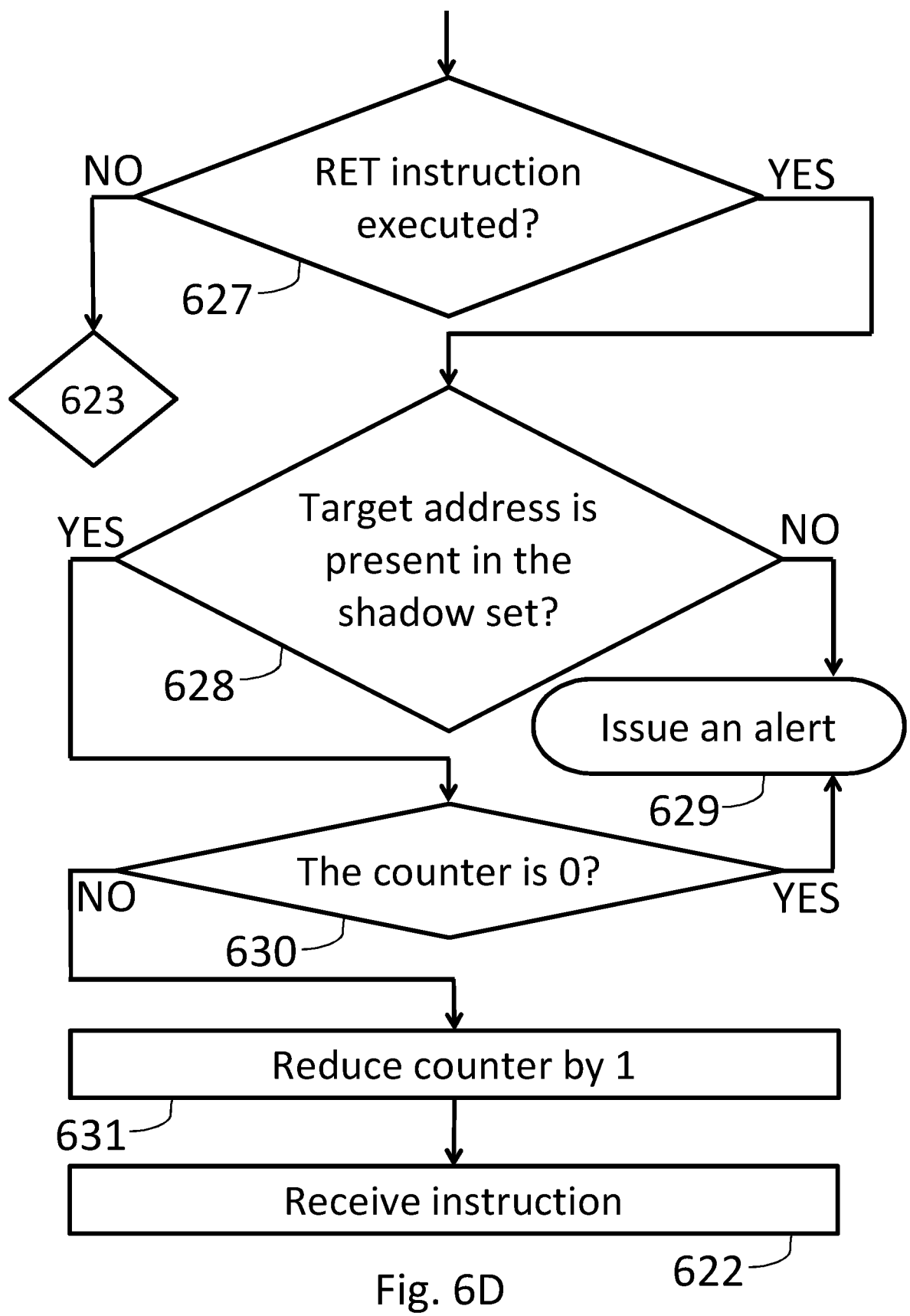
FIG. 6D shows a flowchart for a continuation of the flowchart of FIG. 6C, according to some embodiments of the invention.

FIGS. 6C-6D show a flowchart for a second return oriented programming (ROP) exploit detection algorithm, according to some embodiments of the invention. The second return oriented exploit detection algorithm may include observer CPU 203 to maintain a shadow stack 621, and receive instructions 622. Observer CPU 203 may then check 623 if a 'call' (or return) instruction in the execution flow has been executed for verification.

In case that a call instruction has been executed 623, observer CPU 203 may add 624 the expected return address to the shadow set and update the counter (e.g., initialize counter to '1') and/or add '1' to the existing counter. After the expected return address is added to the shadow set 624, CPU 203 may check if the expected return address already exists in the shadow set 625. In case that the address already exists in the shadow set 625, observer CPU 203 may update the counter (e.g., add '1' to the existing counter) 626a. In case that the address is not in the shadow set 625, observer CPU 203 may update the counter (e.g., initialize the counter to '1') 626b.

In case that a call instruction has not been executed 623, observer CPU 203 may check 627 if a return (RET) instruction has been executed. In case that a return instruction has not been executed 625, observer CPU 203 may return to check 623 the next instruction to be processed.

In case that a return instruction has been executed 627, observer CPU 203 may check 628 if target address is present in the shadow set. In case that target address is not present in the shadow set 628, observer CPU 203 may issue 629 an alert. It should be noted that due to the (circular) flow structure of the algorithm, for each executed instruction the algorithm may perform checks 623 and/or 627 and/or 628 repeatedly. In some embodiments, only when check 628 is positive then the next instruction may be processed.

In case that target address is present in the shadow set 628, observer CPU 203 may check 630 if the counter is '0'. In case that the counter is '0' 629, observer CPU 203 may issue 629 an alert. In case that the counter is not '0' 629, observer CPU 203 may update the counter 631 (e.g., reduce the counter by '1'), and then return to check 622 the next instruction to be processed.

Figure 7:
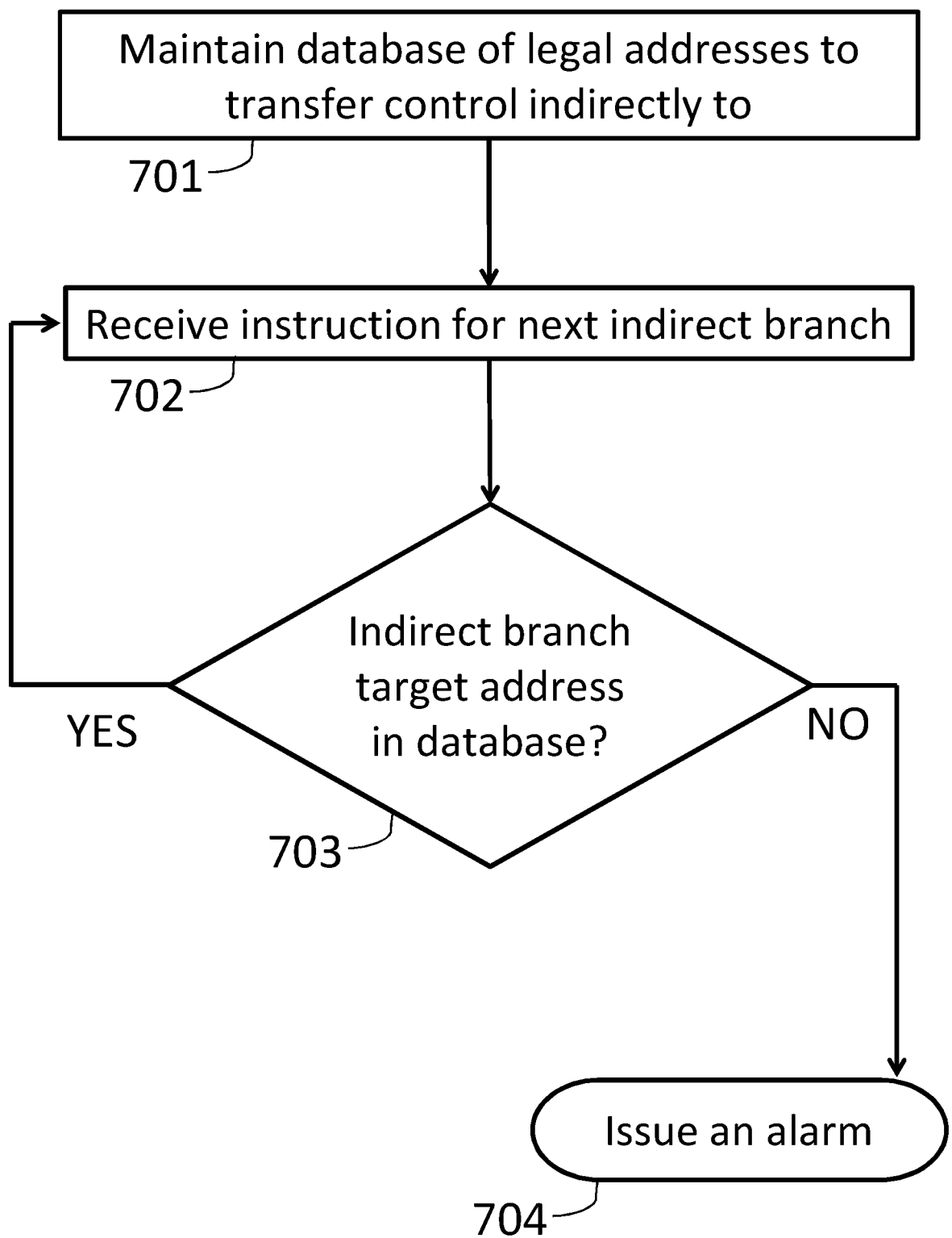
FIG. 7 shows a flowchart for illegal indirect control transfer detection algorithm, according to some embodiments of the invention.

Reference is now made to FIG. 7, which shows a flowchart for illegal indirect control transfer detection algorithm, according to some embodiments of the invention. Indirect program control instructions may calculate the target address based on an argument or variable that resides in a register or memory location. For every indirect branch in the reconstructed execution flow, the target address may be validated against a preprocessed database. The preprocessed database may include legitimate target addresses that the processor is allowed to transfer control to and/or legitimate call-site source addresses to "critical functions" that the processor is allowed to transfer control from. In some embodiments, a critical function may be any function (e.g., of the operating system) that an attacker has interest to invoke in order to successfully carry out the attack. For instance, functions that control memory permissions are "critical" because the attacker may work more freely when the permissions of memory are under his control. In some embodiments, an attacker may enable the execution flag via such critical function.

According to some embodiments, a target address (e.g., collected by parsing memory images of executable code) may be classified as safe if it meets at least one of the following: the address may be in a relocation table of a module, so that the pointer may be fixed at load time and therefore points to an address that is legal to transfer control to, and/or the address may be the entry point of a module, and/or the address may be in the import table/dynamic symbol table of a module so that control may be transferred to these addresses from foreign modules during run time, and/or the address may be in the export table/symbol table of a module so that control may be transferred to these addresses from the current module, and/or the address may be a relative call so that a module may transfer the control flow within itself, and/or the address may be preceded by a 'CALL' instruction in the modules.

Illegal indirect control transfer detection algorithm may include maintaining 701 a database of legal addresses to transfer control indirectly to. In some embodiments, illegal indirect control transfer detection algorithm may further include receiving 702 instructions for next indirect branch, for instance receiving instructions from the reconstructed execution flow. If the address is not in the database 703, an alarm may be issued 704. If the address is in the database 703, then the illegal indirect control transfer detection algorithm may wait until instructions for next indirect branch may be received. In some embodiments, an alarm may be issued if the source of the address of the indirect branch instruction is in the database of legal addresses to transfer control indirectly to.

Reference is now made to FIG. 8, which shows a flowchart for a method of detecting an exploit of a vulnerability of a computing device 210, according to some embodiments of the invention. The method of detecting an exploit of a vulnerability of a computing device may include receiving 801 an execution flow of at least one process running in a processor 201 of the computing device 210, wherein the execution flow is received from a performance monitoring unit (PMU) 204 of the processor 201.

In some embodiments, the method may further include receiving 802 memory pages from a memory of the computing device 210. In some embodiments, the method may further include reconstructing 803 the process on another processor based on the execution flow and the memory pages.

In some embodiments, the method may further include running 804 at least one exploit detection algorithm on the reconstructed process in order to identify an exploit attempt, and issuing 805 and alert for instance upon detection of an exploit. The alert (e.g., to the user) may be issued by processor 201 and/or by observer CPU 203.

In some embodiments, the method may further include interrupting the process running on the processor of the computing device when an exploit is detected.

According to some embodiments, a decoder (to reconstruct the execution) may include a number of abstract layers such as packet layers, event layers, instruction flow layers and block layers. While the trace data that may be generated by the CPU includes packets with logical binary data units that represent different types of events occurring throughout the lifecycle of execution, the decoding process may add information to the context at each layer until the final reconstruction is achieved. Therefore, matching the detection algorithm to the correct layer may allow maximizing performance and visibility of the system. In some embodiments, the performance order of the layers may be packet, event, instruction flow and block layer where each layer may have different visibility.

In some embodiments, the algorithms described in FIGS. 3 and 7 may correspond to decoder with an event layer. In some embodiments, the algorithms described in FIGS. 4A-4B and 6A-6D may correspond to decoder with a block layer. For example, shadow set algorithms may detect abused return instructions that transfer control to attacker chosen addresses. In order to be able to have the visibility it needs, shadow set may be matched with the block layer. This may be due to the fact that only from the instruction flow layer and above (e.g., the block layer) the context may include the type of the instruction executed by the CPU.

Figure 9A:
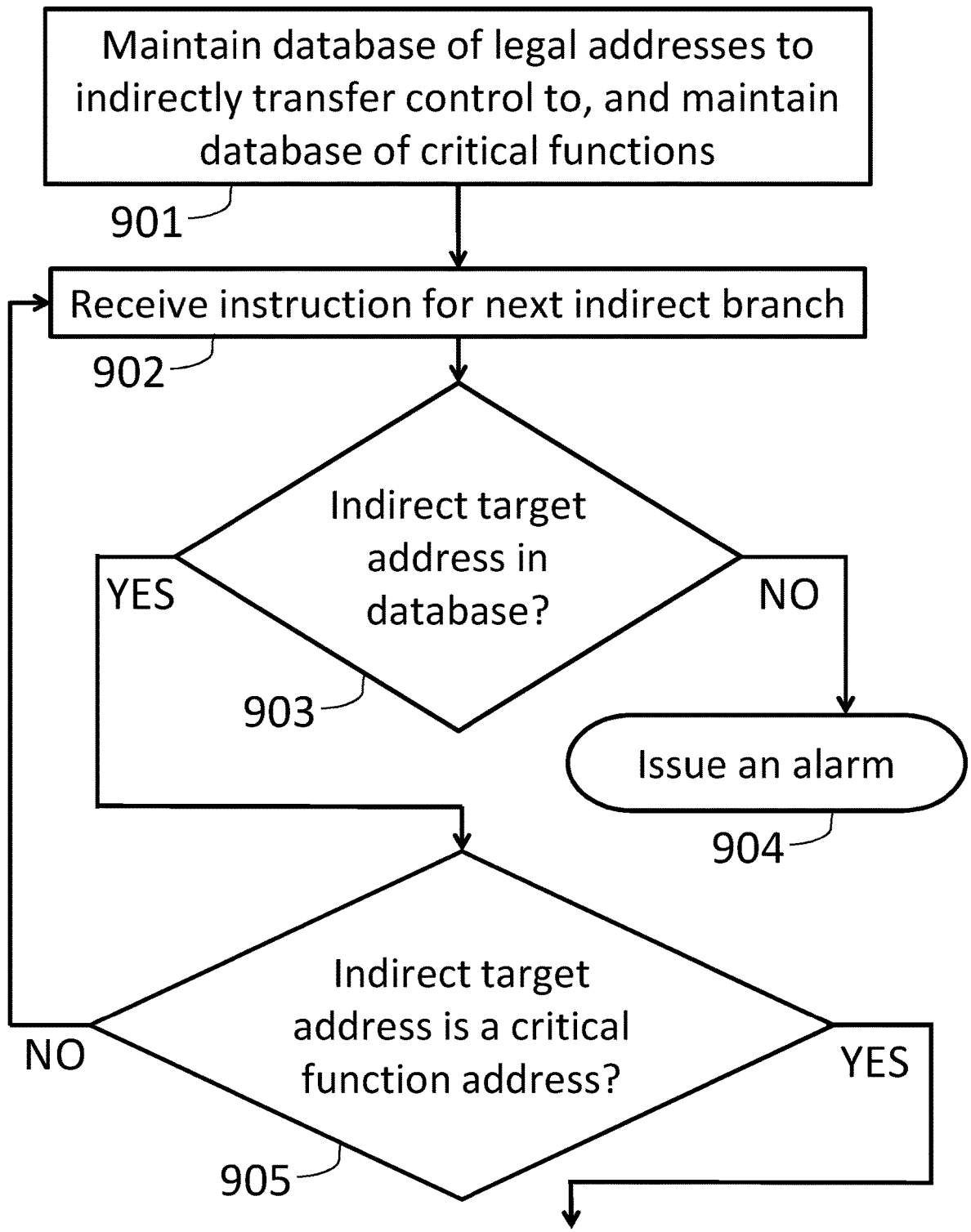
FIG. 9A shows a flowchart for combined algorithm operation, according to some embodiments of the invention.
Figure 9B:
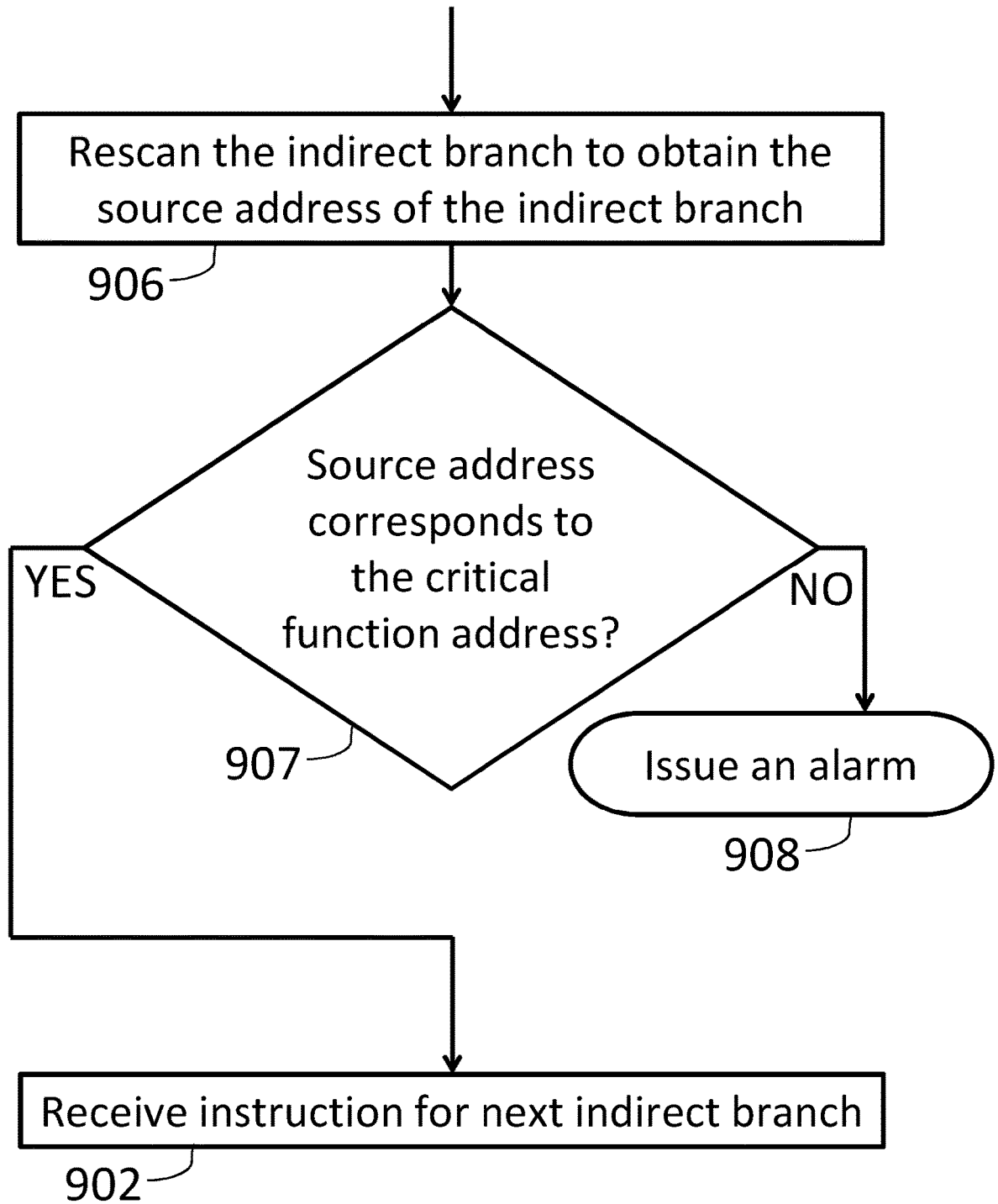
FIG. 9B shows a flowchart for a continuation of the flowchart of FIG. 9A, according to some embodiments of the invention.

Reference is now made to FIGS. 9A-9B, which show a flowchart for combined algorithm operation, according to some embodiments of the invention. According to some embodiments, at least two different algorithms may be operated simultaneously and/or in combination (e.g., in hybrid mode) such that each algorithm may be activated and/or switched when needed. For example, detecting an indirect branch target address of a 'critical function' and switching to scan the indirect branch source address of the corresponding function for suspect indirect calls.

The combined algorithm may include maintaining 901 a database of legal addresses to indirectly transfer control to and/or maintaining 901 a database of critical functions. In some embodiments, the combined algorithm may further include receiving 902 instructions for next indirect branch, for instance receiving instructions from the reconstructed execution flow. If the indirect branch target address is not in the database 903 (e.g., database of legal addresses to indirectly transfer control to), the combined algorithm may issue an alarm 904. If the indirect branch target address is in the database 903 (e.g., database of legal addresses to indirectly transfer control to), the combined algorithm may check 905 if the indirect target address is a critical function address.

In case that the indirect target address is not a critical function address 905, the combined algorithm may return to receiving 902 instructions for the next indirect branch. In case that the indirect target address is a critical function address 905, the combined algorithm may rescan 906 the indirect branch to obtain the source address of the indirect branch. After rescanning 906, the combined algorithm may check 907 if the source address corresponds to the critical function address (e.g., in the critical function address database). In case that the source address does not correspond to the critical function address 907, an alarm may be issued 908. In case that the source address corresponds to the critical function address 907, the combined algorithm may return to receiving 902 instructions for the next indirect branch.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments may of course include features from other embodiments presented, and embodiments not specifically described may include various features described herein.

The invention claimed is:

1. A method of detecting an exploit of a vulnerability of a computing device, the method comprising:
   receiving an execution flow of at least one process running in a first physical processor of the computing device, wherein the execution flow is received from a performance monitoring unit (PMU) of the first physical processor;
   receiving memory pages from a memory of the computing device;

continuously checking, by another physical processor which is physically separate from the first processor, the execution flow of the first processor, to identify a memory value that is mapped to stack memory by the another physical processor;

reconstructing the execution flow of the process on the another physical processor based on the execution flow received from the PMU and the memory pages;

running at least one exploit detection algorithm on the reconstructed execution flow of the process in order to identify an exploit attempt; and issuing an alert.

2. The method of claim 1, further comprising interrupting the process running on the first physical processor of the computing device when an exploit is detected.

3. The method of claim 1, further comprising maintain map of addresses in memory of the first physical processor.

4. The method of claim 1, further comprising mapping a structured exception handler (SEH) of the operating system of the first physical processor.

5. The method of claim 4, further comprising adding a memory address of the SEH.

6. The method of claim 4, further comprising checking if the structured exception handler (SEH) is registered.

7. The method of claim 1, further comprising mapping at least one of memory allocation addresses and memory deallocation addresses.

8. The method of claim 7, further comprising checking if at least one of memory allocation function and memory deallocation function is called.

9. The method of claim 7, further comprising increasing at least one of allocation counter and deallocation counter.

10. The method of claim 7, further comprising checking if difference of allocation counter and deallocation counter is greater than a predefined value.

11. The method of claim 1, further comprising receiving at least one instruction.

12. The method of claim 1, further comprising maintaining a shadow stack.

13. The method of claim 12, further comprising checking if a call instruction in the execution flow has been executed.

14. The method of claim 12, further comprising pushing expected return address to the shadow stack.

15. The method of claim 12, further comprising checking if a return instruction has been executed.

16. The method of claim 12, further comprising checking if target address is different from top address on shadow stack.

17. The method of claim 12, further comprising popping an address from the stack.

18. The method of claim 1, further comprising:
maintaining a database of legal addresses to transfer control indirectly to; and
receiving instructions for indirect branch from the reconstructed execution flow.

19. The method of claim 18, further comprising checking if the received instruction corresponds to the database of legal addresses to transfer control indirectly to.

* * * * *